Figure 1:
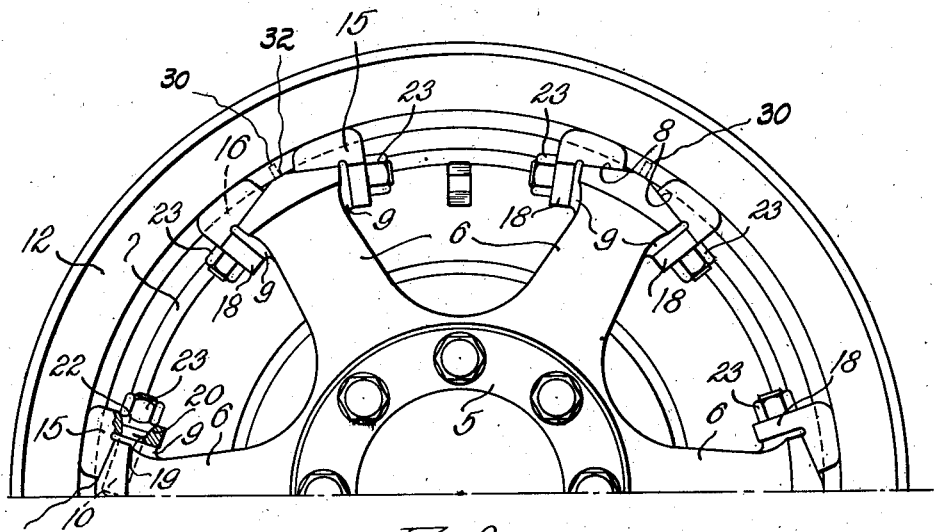

July 9, 1946.  F. W. BURGER  2,403,634

WHEEL

Filed June 11, 1945

INVENTOR.
Frederick W. Burger
BY

Patented July 9, 1946

2,403,634

UNITED STATES PATENT OFFICE 2,403,634

WHEEL

Frederick W. Burger, Niles, Mich., assignor to Clark Equipment Company, Buchanan, Mich., a corporation of Michigan Application June 11, 1945, Serial No. 598,679

14 Claims. (Cl. 301—13)

This invention relates to wheels, and more particularly is concerned with a dual wheel construction of the cast spoke type in which tire rims are demountably carried on the ends of the spokes.

In particular, the present invention concerns itself with dual wheels for use on trucks, buses and other similar types of vehicles in which it is desired that the two rims be mounted on the wheel body in such manner as to be parallel to each other and disposed positively in planes at right angles to the axis of rotation of the wheel. This is to provide true lateral alinement of the rims and to insure even tire wear. In addition, the present invention contemplates a construction in which the rims will be chorded intermediate the spokes by a clamping action, and yet will be arranged concentrically with the wheel spider to prevent unbalance and other conditions sometimes encountered in demountable dual wheel assemblies.

Heretofore, dual wheel assemblies of the cast spoke type have been of two general constructions, one of which embodied a circumferential central abutment with lug means and spacer bands for drawing the rims toward the center abutment thereby providing positive alinement of the rims, the lugs being mounted for axial movement on axially directed shoulders formed on the ends of the spokes. This construction requires the use of separate spacer bands and independent lugs on the inboard and outboard sides of each spoke end. In the other type of construction heretofore used, the wheel has been designed with tapered seats on the inboard ends of the spokes, with the inboard rim moving up against such seats and a wide spacer band being employed between the lateral edge of the inboard rim and the corresponding edge of the outboard rim, the entire assembly being shifted axially by individual lugs at each spoke and moving axially inwardly on lug supporting shoulders.

Both of these previous constructions have been objectionable from the standpoint of uniformity of mounting, securing of positive lateral alinement in planes at right angles to the axis of rotation, and in imposing severe stresses upon the shoulders and lugs by which the rims are clamped to the spoke ends.

In addition, these wheels require very accurate machining operations because of the length of travel of the lugs and are expensive to manufacture.

The present invention contemplates a relatively simplified type of wheel spider having cast spoke ends provided with oppositely tapered seats extending in a vertical direction. Lug means are provided for each of the seats and are formed with suitable gutter receiving recesses for engaging the gutter edges of the rims, the lugs however being so designed as to have complete support directly upon the spoke ends so that the load from the rims is transmitted directly to said spoke ends and to provide within themselves the spacing means for maintaining the rims in accurate spaced alinement. Furthermore, with this construction the clamping and unclamping of the lugs is facilitated, since the clamping nuts are readily accessible from a position intermediate the spokes and are not shrouded within U-shaped cavities such as has heretofore been the practice with axially movable lugs.

It is, therefore, an object of the present invention to provide a construction of this type which is simple in design and assembly, requires little or no machining of the spoke ends and yet provides a positive lug clamping arrangement which will maintain the rims in strict alinement, provide the proper chording of the rims to maintain them tight upon the wheel spider, and in which the clamping action serves both to seat the rims in position and to space them accurately with respect to each other.

Other objects and advantages of the present invention will appear more fully from the following detail description which, taken in conjunction with the accompanying drawing, will disclose to those skilled in the art the particular construction and operation of a preferred form of the present invention.

Figure 2:
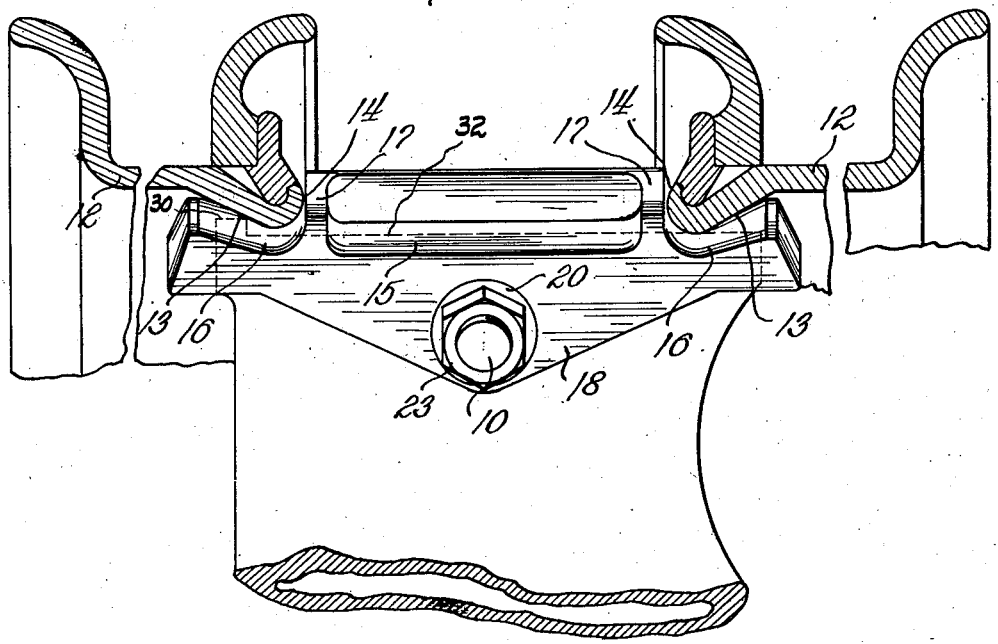

In the drawing:

Figure 1 is an elevational view of a wheel embodying the present construction with a portion thereof in section; and Figure 2 is a view of one of the spoke ends with the rim shown in section.

Referring now in detail to the drawing, there is disclosed a wheel spider indicated generally at 5 having radially extending hollow spokes 6 and having secured to the rear face thereof a brake drum 7 in the usual manner. The spoke ends 6 in the present form of the invention are solid at their outer ends and are provided with oppositely directed tapered seats 8 which are machined axially to provide planar seats sloping in opposite directions at approximately a 20° angle with respect to a horizontal plane. Also, at each of the spoke ends there is provided a boss on opposite circumferentially directed faces thereof, such bosses being indicated at 9, which are disposed respectively at right angles to the associated tapered seats 8. These bosses project slightly out of the plane of the side walls of the spokes and are adapted to receive centrally therein stud members 10 disposed centrally thereof and projecting outwardly of the boss surface as indicated at the left-hand side of Figure 1.

Two tire-receiving rims 12 are provided, these rims each having a gutter or bevel edge 13 and a lateral face 14 for a purpose to be described hereinafter.

In order to mount the rims 12 upon the wheel body 5 there is provided a plurality of wheel mounting lug members indicated generally at 15 which are provided with laterally spaced grooved recesses 16 as shown in Figure 2, these recesses conforming generally to the shape of gutter edge 13 and terminating at their inner portions in vertically extending ribs 17, the ribs 17 being spaced apart a distance equal to the spacing desired between the tire rims. The lugs 15 are provided with depending tongue portions or end flanges 18 which are apertured as indicated at 19 and are provided with a chamfered recess 20 adjacent the outer ends of the openings 19, the chamfered recess 20 being adapted to receive the chamfered portion 22 of the locking nuts 23 threaded upon the studs 10. It will be noted that the gutter-receiving recesses 16 of the lugs 15 may be arcuate in circumferential extent, conforming to the arcuate shape of the rims, or they may be straight or otherwise formed so as to provide a good seat for that portion of the gutter which is received therein. In order to position the rims on the wheel the lugs are first removed and the inboard rim is moved over the spoke end toward the inboard side of the spider. Stops 30 formed at the inboard ends of the transverse lands 32 on the spoke ends intermediate the seats 8 prevent the inboard rim moving beyond the desired position. Two or possibly three sets of lugs are then placed in position and initially drawn up. The outboard rim is then hung over these lugs, centering on the land 32, and the remaining lugs are applied over the studs 10, the under surface of the lugs resting on the seats 8 across the entire transverse extent thereof. As the nuts 23 are tightened, the lugs 15 are moved circumferentially and also radially outwardly due to the angularity of the seats 8, thus exerting a radial expanding force on the rims to chord the rims intermediate the spoke ends and at the same time to provide a positive seating engagement of the gutter edges of the rims within the recesses 16.

The construction is so designed that the lugs 15 when wedged into final position have the tongue portions 18 thereof seated against the surface of the bosses 9, thereby providing a positive stop and insuring that the lug has been driven up into its final position. Also, by reason of the chamfered seating engagement of the nut 23 in the recess 20 it will be apparent that the lugs are centered definitely with respect to the studs 10 so that the ribs 17 which define the spacing between the rims will be positively positioned with respect to a vertical plane through the wheel spider to provide positive parallel alinement of the rims in planes at right angles to the axis of rotation.

With this arrangement it is believed that a positive locking of the rims upon the spoke ends is provided with a minimum amount of machining required in the wheel body and with the assurance that the lugs will transmit the load from the rims directly to the spoke ends through the seats 8. Also, there will be no tipping or rocking of the lugs due to the abutment of the tongues 18 with the bosses 9 and the fact that the lugs are in seating engagement on the surfaces 8 throughout the entire transverse extent of such seating surfaces. Consequently, the lugs will be fixed in position when the nuts 23 are finally clamped tight to provide for maintaining the rims in positive alinement and in concentric position relative to the axis of the wheel spider.

It is, therefore, believed apparent that I have provided a novel type of dual wheel assembly, departing entirely from the customary type of such assembly heretofore noted, and I therefore do not intend to be limited except as defined by the scope and spirit of the appended claims.

I claim:

1. In a dual wheel assembly, a wheel spider having radially extending spokes provided at their ends with oppositely sloping seating surfaces extending in a circumferential direction, rim-receiving lugs adapted to seat on each surface at each spoke end, said lugs having transversely spaced rim-receiving recesses for receiving the bevel edges of opposed inboard and outboard tire rims, and radial shoulders defining the inner axial portions of said recesses to provide predetermined axial spacing of said rims on said lugs.

2. In a dual wheel assembly, a wheel spider having radially extending spokes provided at their ends with circumferentially directed oppositely sloping seats, stud means extending circumferentially outwardly from said spoke ends radially inwardly of and parallel to said seats, lugs having seating portions slidable on said seats and depending tongue portions apertured to move over said studs, and clamping nuts cooperating with said tongues and studs to center said lugs on said seats, said lugs having circumferentially arranged recesses designed to receive the gutter edges of axially spaced tire rims, and to maintain said rims in predetermined axially spaced position on said spider.

3. In combination, a wheel spider having radially extending hollow spokes provided with solid ends arranged to provide circumferentially directed oppositely sloping seats, tapered lugs adapted to be clamped on said seats, and axially spaced rim-receiving recesses in the outer surfaces of said lugs for receiving the bevel edges of inboard and outboard tire rims, whereby said rims are chorded radially on said spider and are maintained in predetermined axially spaced relation.

4. The combination of claim 3 including clamping means for centering said lugs on said seats in a common vertical plane normal to the axis of said spider.

5. The combination of claim 3 wherein said lugs move radially outwardly along said seats into clamped position to provide for chording of said rims intermediate said spoke ends.

6. The combination of claim 3 including circumferentially directed axially spaced radial shoulders on said lugs forming axial abutments for the adjacent lateral edges of said rims.

7. In combination, a wheel spider having radially extending hollow spokes provided with solid spoke ends, each spoke end having formed thereon circumferentially directed oppositely sloping seats extending transversely thereacross, circumferentially directed studs arranged in a common vertical plane radially inwardly of and parallel to said seats, lugs engaging on said seats for the full width thereof and having depending portions centered over said studs, circumferentially directed recesses in said lugs adjacent opposite sides thereof adapted to receive the annular bevel edges of opposed inboard and outboard tire rims, and clamping nuts engaging said studs to move said lugs over said seats to provide radial outward clamping pressure on said rims at said spoke ends.

8. The combination of claim 7 including circumferentially extending axially spaced radial shoulders on said lugs providing abutments for predetermining the axial spacing of said rims thereon.

9. The combination, with a spoke end of a wheel spider having radially extending hollow spokes, said spoke end having oppositely directed seats extending circumferentially and radially inwardly from the transverse center of said spoke end, of lugs having seating engagement on said seats for the full transverse width thereof and having a normally depending centrally apertured flange, studs extending parallel to said seats radially inwardly thereof and projecting through said flange aperture, axially spaced rim-receiving recesses in said lugs for mounting the gutter edges of axially spaced tire rims therein, and clamp means engaging said studs for clamping said lugs in fixed position on said spoke end.

10. In combination, a wheel spider having spoke ends provided with circumferentially directed oppositely sloping seats, lugs for each of said seats, means on said lugs for supporting the annular bevel edges of a pair of tire rims thereon, and means for clamping said lugs on said spoke ends.

11. The combination of claim 10 wherein said rim supporting means includes means providing for predetermined axial spacing of said rims on said lugs.

12. The combination of claim 10 wherein said clamping means includes means for alining all of said lugs with reference to a vertical plane through said spider.

13. The combination of claim 10 including radially extending circumferential shoulders on said lugs forming axial abutments for predetermining the axial spacing of said rims.

14. In combination, a wheel spider having spoke ends provided with circumferentially directed oppositely sloping planar seats, lug means engageable with each seat having arcuate annular recesses adjacent the transverse sides thereof for receiving the bevel edges of a pair of tire rims, and clamping means associated with said spoke ends for moving said lugs toward each other on said seats whereby said recesses are moved radially to expand the effective diameter thereof for positively clamping said rims thereon.

FREDERICK W. BURGER.